Nov. 9, 1971   C. S. McARTHUR   3,618,365
CIGARETTE AND FILTER INSPECTION SYSTEM
Filed Jan. 26, 1970   4 Sheets-Sheet 1
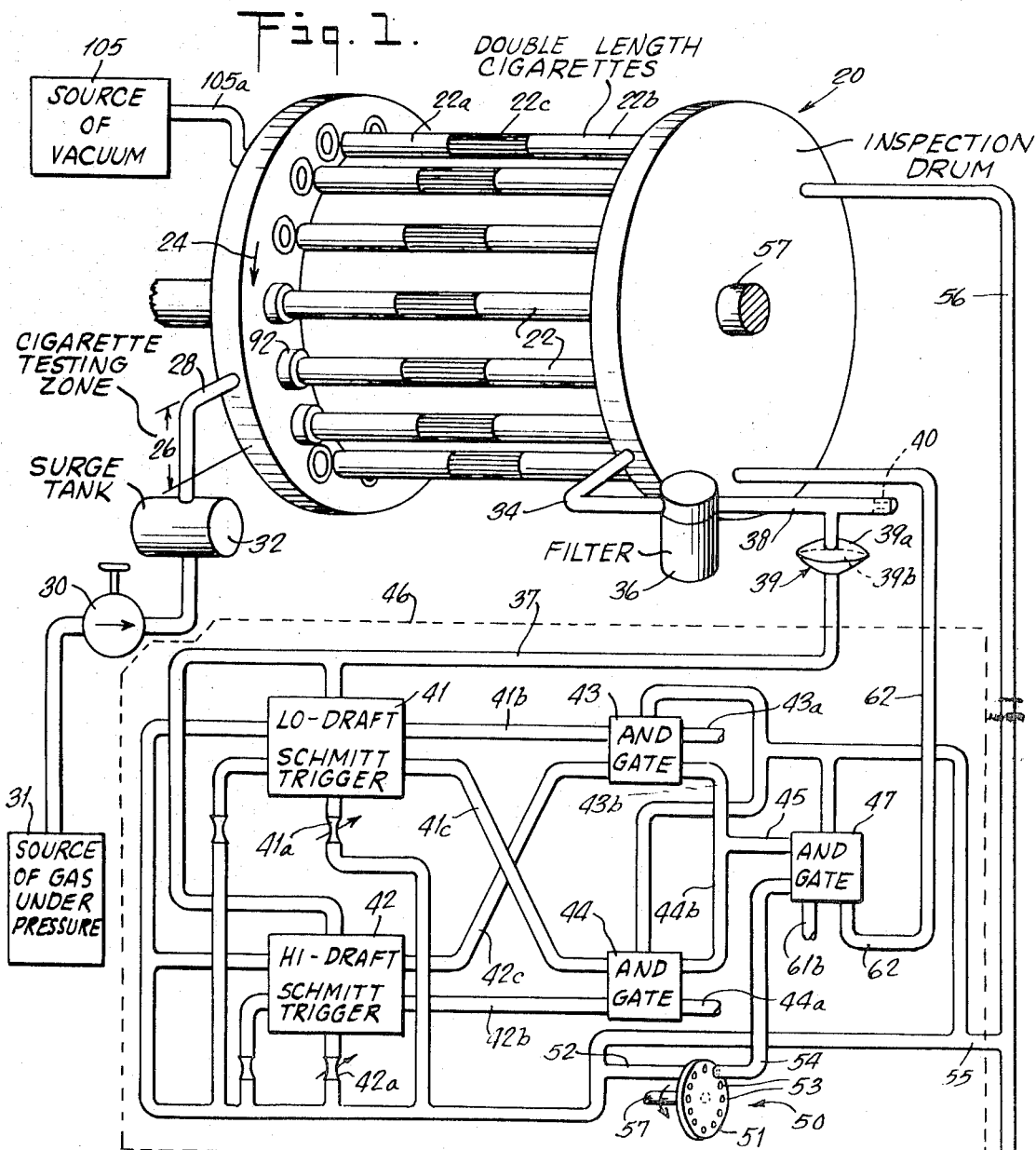
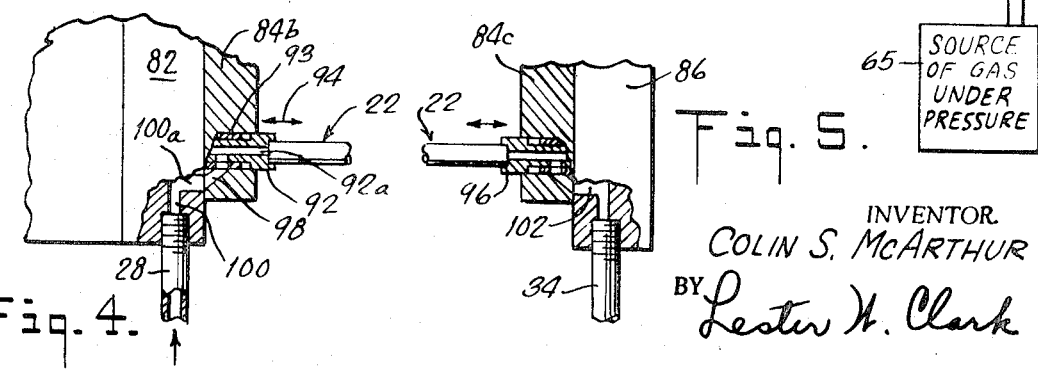
INVENTOR.
COLIN S. McARTHUR
BY Lester W. Clark
ATTORNEY

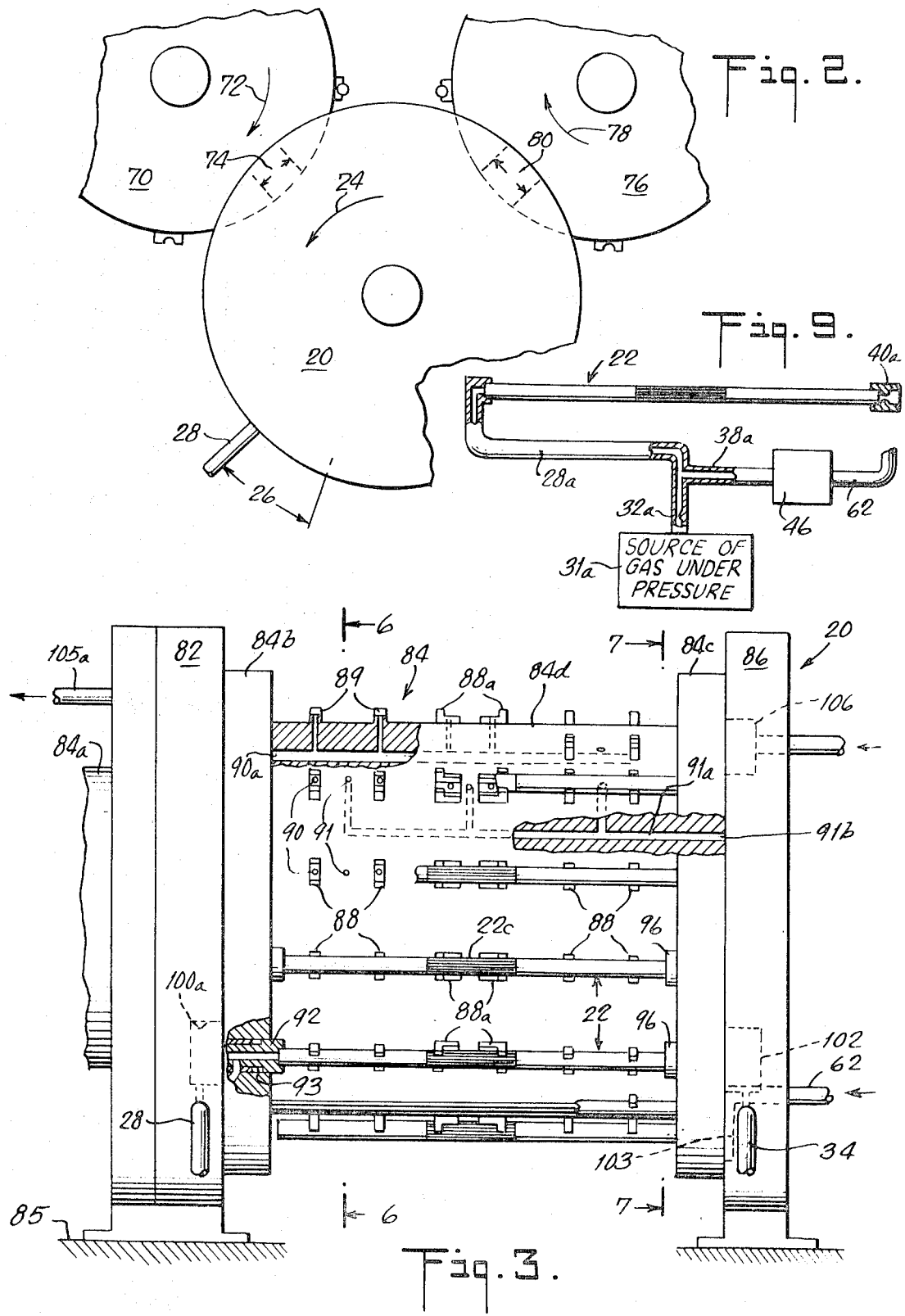

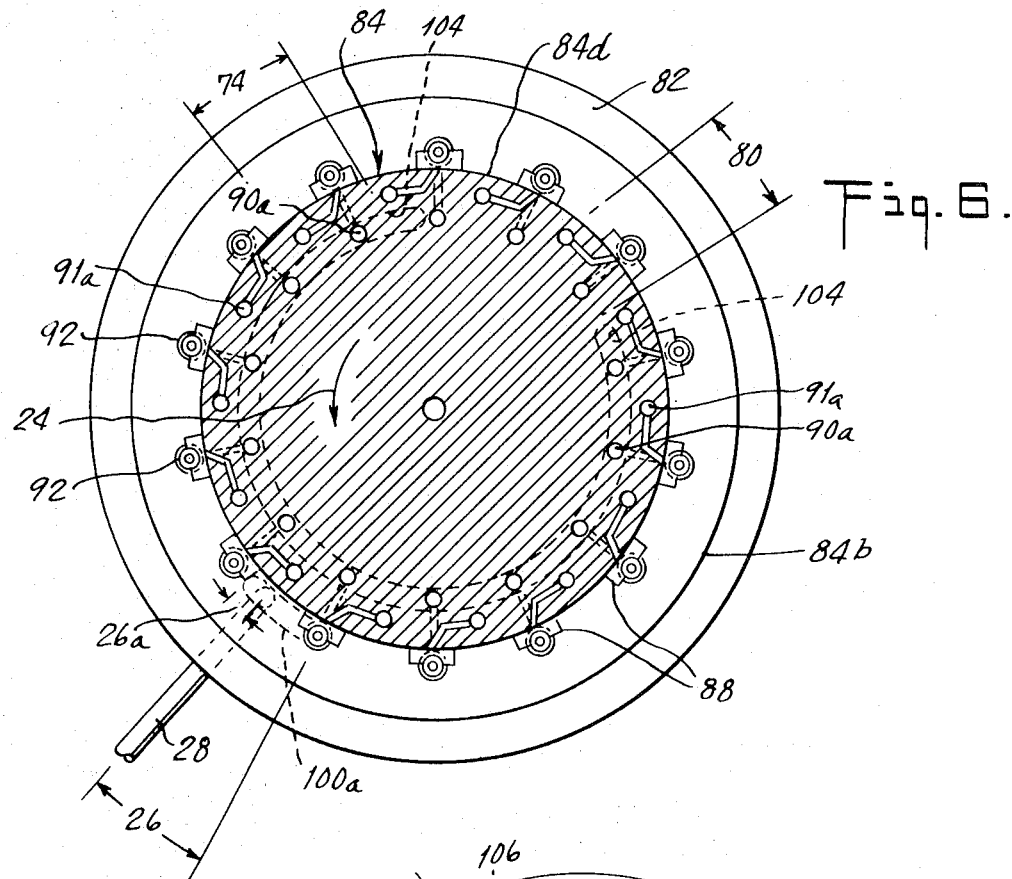
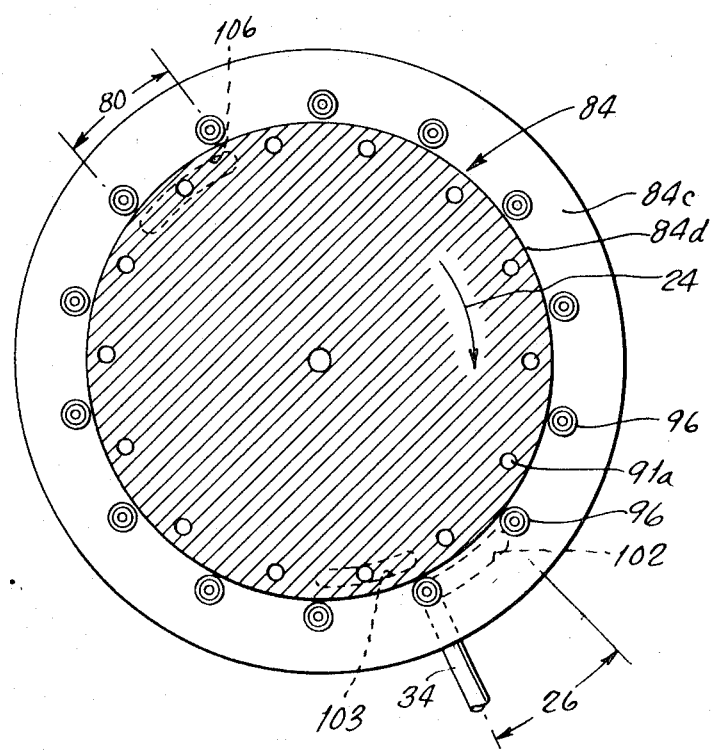

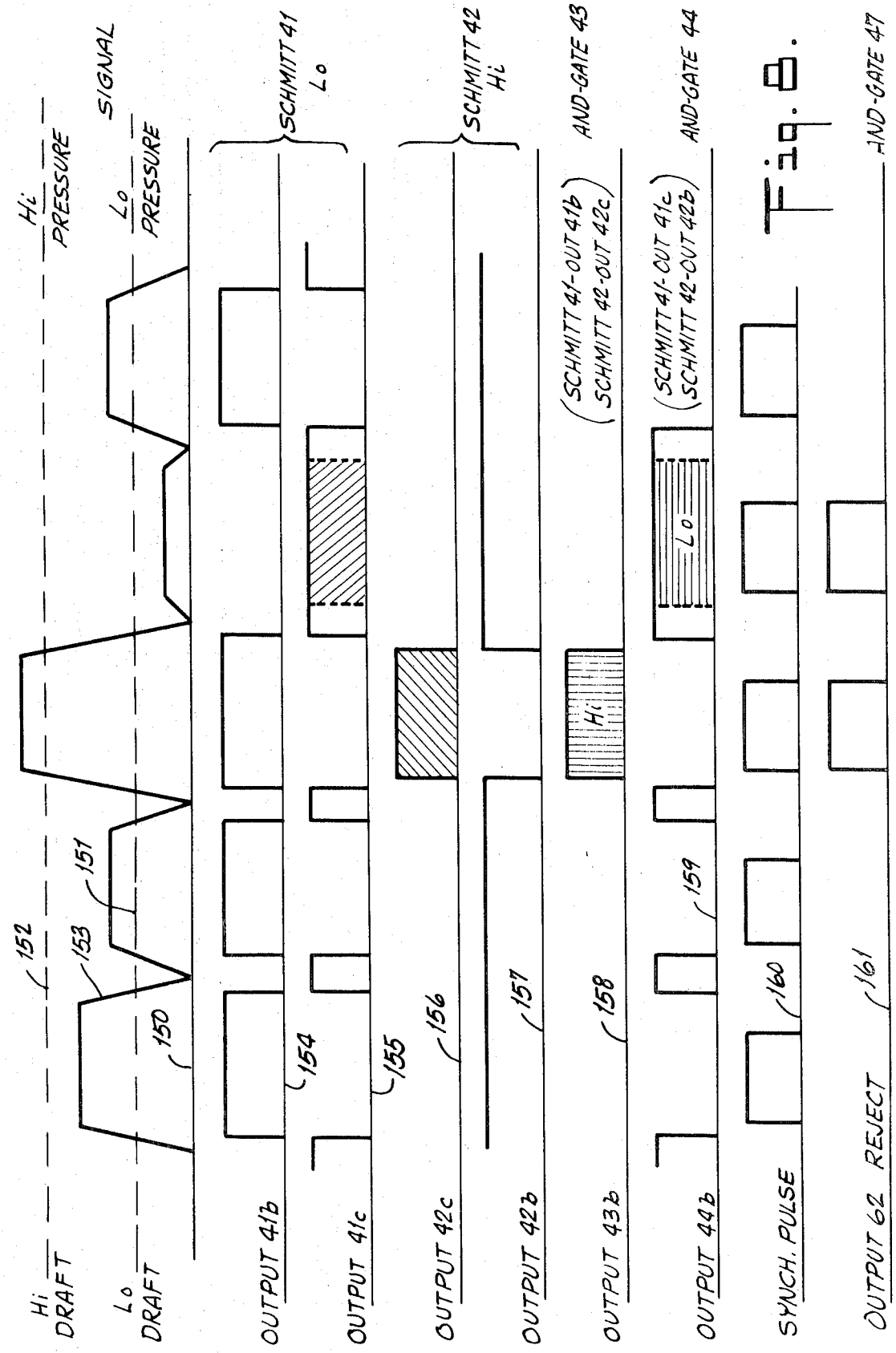

United States Patent Office 3,618,365
Patented Nov. 9, 1971

3,618,365
CIGARETTE AND FILTER INSPECTION SYSTEM
Colin S. McArthur, Winston-Salem, N.C., assignor to R. J. Reynolds Tobacco Co., Winston-Salem, N.C.
Filed Jan. 26, 1970, Ser. No. 5,592
Int. Cl. G01m 3/04, 3/26
U.S. Cl. 73—45.1
15 Claims

ABSTRACT OF THE DISCLOSURE

Cigarette and filter inspection apparatus comprising means for applying a test pressure individually to cigarettes or filters in a high-speed manufacturing line and fluidic means for sensing the level of the pressure flow in each and supplying a reject signal when the flow level is above or below an acceptable range. The fluidic means comprises both a high and a low level pressure-sensing Schmitt trigger and two and-gates, each of which receives one output from each Schmitt trigger and has one of its outputs mutually feeding a third and-gate whose other input is a synchronized pulse timed with the application of a test pressure pulse. Thus, when the level of the pressure flow in a given cigarette or filter is outside an acceptable range, the output of the appropriate Schmitt trigger will shift, shifting the output of the corresponding and-gate and when coincident with a synch pulse, shifting the output of the third and-gate to actuate a memory or reject means. The system automatically resets itself after each testing.

BACKGROUND OF THE INVENTION

The present invention relates to cigarette inspection apparatus and more particularly to means for detecting and rejecting cigarettes or filters whose draft level is above or below an acceptable pressure range.

Cigarette draft or pressure flow inspecting apparatus, in the past, has been particularly directed to the detection of leaks in the wrappers or filter joints of cigarettes so that prior sensing systems have been designed to actuate memory and reject means when the level of the draft pressure within a particular cigarette drops below a given value. However, with the growing use of cigarette filters and new filtering methods, the possibility arises of complete blocking or high restriction of the test pressure within the cigarette, or of very low resistance to pressure flow through the cigarette, so that a need has arisen for detecting defective cigarettes within which the draft or pressure flow may either drop below or exceed an acceptable value.

Particularly desirable draft level inspecting systems of the prior art use fluidic sensing means such as disclosed, for example, in the U.S. patents to McArthur et al., Nos. 3,426,582 and 3,426,583. These systems provide the accurate, high speed inspection, which is required with present-day high-speed cigarette making machines, as they operate upon fluid principles, which permit extremely rapid response and excellent reliability due to the lock rapid response and excellent reliability due to the lack of moving parts.

The apparatus of the presnet invention is an improvement on the cigarette-testing apparatus shown in the above-cited patents and contains fluidic sensing means which will detect the deviation of the level of the draft or pressure flow through a cigarette both above and below a predetermined range.

SUMMARY OF THE INVENTION

The cigarette inspecting apparatus of the present invention comprises means for conveying a succession of cigarettes through an inspection station, wherein the interiors of the cigarettes are individually subjected to a test pressure at a predetermined level, and fluidic sensing means for providing a signal to operate a rejection means when the level of pressure flow in a cigarette is either above or below an acceptable range of pressure.

In the present system, the test pressure is applied at one end of the cigarette and may be measured either at the input end or the output end, as desired, with slight modification. The fluidic sensing means comprises two pressure level sensing elements, such as Schmitt triggers, one set to switch its output flow when a given input pressure level is exceeded and the other set to switch when the input pressure drops below a given pressure level. Each of the Schmitt triggers has an input channel which receives a signal indicating the draft level within the cigarette being tested and each has outputs connected to coincidence means, such as two and-gates . Each of the and-gates receives the normal output flow from a respective Schmitt trigger and the switched output flow from the other Schmitt trigger. The two and-gates, in turn, each have an output which may actuate a memory or reject means directly or which may mutually feed a third and-gate whose other input is a pressure pulse synchronized with the passing of a cigarette through the inspection station. Thus, when the draft level in a given cigarette is outside an acceptable range, the output of the appropriate Schmitt trigger will shift, shifting the output of one of the and-gates to cause rejection, or in the latter case, when coincident with a synch pulse, shifting the output of the third and-gate to actuate a memory or reject means for removing the defective cigarette from the manufacturing line.

BRIEF DESCRIPTION OF THE DRAWINGS

FIG. 1 illustrates an inspection apparatus embodying the invention, having mechanical components shown in a simplified perspective view and fluidic components shown in a simplified diagrammatic view;

FIG. 2 is a side view of the mechanical apparatus of FIG. 1, diagrammatically showing associated apparatus in an operational environment;

FIG. 3 is a view of a cigarette-conveying apparatus incorporating one form of means for subjecting the cigarettes to a source of gas to inspect for draft level and one form of cigarette rejection means;

FIGS. 4, 5, 6 and 7 are sectional views of portions of the apparatus shown in FIG. 3, taken along the lines 4—4, 5—5, 6—6 and 7—7 of FIG. 3;

FIG. 8 is a diagram depicting the operating fluid flow outputs of the various fluidic components in response to different draft level signal inputs;

FIG. 9 is a simplified view of a second form of means for subjecting the cigarettes to a source of gas for inspection.

DETAILED DESCRIPTION

As employed herein, the term "cigarette" is intended to refer to any rod-like article containing a permeable filler and any self-contained smoking article, such as a cigar or cigarette, whether with a filter or not, and of a multiple as well as a single length, or filter elements alone, either as single or multiple units.

A complete system in accordance with the present invention is shown broadly in FIG. 1 wherein means for conveying, inspecting and rejecting the cigarettes is presented in the upper portion of the figure and fluidic means for sensing the draft level and providing a rejecting signal is shown in the lower portion of the figure. More particularly, the conveying means comprises a drum assembly 20, which is adapted to carry a line of cigarettes thereon continuously in sequence through a testing zone 26 wherein each is inspected for draft level. The cigarettes 22 are supplied to the drum assembly 20, which conveys them in the direction of the arrow 24, by a supply drum assembly 70, shown in FIG. 2, which rotates in the opposite sense, as indicated by arrow 72. The conveying surfaces of the drum assemblies 20 and 70 pass closely adjacent to each other in the region 74, wherein cigarettes on the surface of drum assembly 70 are transferred to the surface of drum assembly 20 in a manner which will be described in greater detail below. The cigarettes on drum assembly 20 are then carried through testing zone 26 and upon inspection are either rejected as being defective or are retained on the drum and thereafter transferred to a further closely adjacent rotating drum assembly 76. Drum assembly 76 rotates in the direction indicated by arrow 78 and receives the cigarettes in transfer zone 80, again in a manner to be described.

The particular cigarettes shown are of the dual length type, comprising tobacco-filled end portions 22a and 22b, separated by a double-length filter section 22c in the middle and fastened together by means of tipping paper and an adhesive. Each double length cigarette 22 is carried by the drum assembly 76 for further processing, during which it is subsequently cut in the middle of filter section 22c to produce two standard filter-type cigarettes.

At testing zone 26, a stream of gas (typically air) under a constant pressure greater than ambient pressure, is applied to the interior of each cigarette 22. The test-gas-supplying means comprises a conduit 28 which is connected to a source of gas under pressure 31. A regulator means 30, for controlling the level of the gas flow and a surge tank 32 to maintain the flow of gas constant may be included in the system. Alternatively, a test pressure below ambient pressure may be used if desired. However, for the sake of brevity, only operation of the system with a positive pressure will be described but it will be readily apparent to those skilled in the art, in view of the following description, how the disclosed system may be easily adapted to such alternative use.

The stream of gas conduit 28 at a selected pressure level is coupled to each cigarette as it passes through the testing zone 26 by means contained in drum assembly 20 which will be described in greater detail below. The gas stream flows through the cigarette in the testing zone 26 and out the opposite end of the cigarette through another arrangement to be described, which is coupled to an outlet conduit 34. The outlet conduit 34 is connected to a filter apparatus 36, which filters out any tobacco that may be present in the gas after leaving the cigarette. The gas stream is then led by a conduit 38 past a pressure-sensing diaphragm assembly 39 and through a throttle 40 to atmosphere. The diaphragm assembly 39 which is in the form of a chamber 39a containing a flexible diaphragm 39b, senses the pressure level of the gas stream in conduit 38, and converts it to a fluid signal which operates as an input to the fluidic sensing means 46, of the present invention shown in the lower half of FIG. 1 within the broken line envelope. The fluid input from diaphragm assembly 39 controls the fluid output from means 46 so that the output flow will occur in either of two fluid lines, depending upon the level of input pressure in conduit 38. The output flow will normally be through passage 61b, but in the event that a defective cigarette is sensed, the flow will be switched to conduit 62, to be fed back for controlling the rejection means contained in the drum assembly 20. The diaphragm assembly 39 isolates the fluidic sensing means 46 from any dust or other contaminants entrained along conduit 38, however, where it is found that filter 36 is adequate in removing such contaminants, the diaphragm assembly 39 may be eliminated.

CONVEYING MEANS

Turning now to the particular details of construction and operation of the drum assembly 20, as shown in FIG. 3, the assembly comprises a fixed head 82 having a rotatable drum 84 journalled therein with a further fixed head 86 abutting the opposite end of the drum. The heads 82 and 86 serve to mount the drum assembly 20 to a suitable support frame 85. The drum 84 comprises a reduced diameter portion 84a, which extends through the fixed head 82, and an intermediate stepped portion 84b at one end, and, at the other end, an end flange 84c, which abuts the fixed head 86.

The surface of the main body 84d of the drum 84 is provided with a number of evenly spaced rows of holders 88, each of which contains a flute 89, that is approximately semicylindrical so as to accept a portion of the cylindrical surface of one of the cigarettes 22 to be carried on the drum. A central pair of elongated holders 88a in each row receives the surface of substantially the entire filter portion 22c of the double length cigarette held in the row.

The means for holding the cigarette comprises a central orifice 90 in each holder 88, opening underneath the cigarette in the flute 89. The central holders 88a in each row are also provided with a pair of such orifices. All of the orifices 90 are connected by internal passageways 90a within the drum 84 through a chamber 104 in the head 82 (FIG. 6) and a conduit 105a to a source of vacuum 105, which produces a suction retaining the cigarettes within the flutes 89.

Each of the rows of holders 88 also contain orifices 91 which are connected by internal passageways 91a within the drum 84 through suitable chambers 103, 106 in head 86 (FIG. 7) to a positive source 65 of gas pressure, such as compressed air, so that each row is provided with means for ejecting a cigarette from the drum when appropriate. Consequently, means are provided whereby cigarettes may be picked up and carried on, or rejected from, the surface of the drum 84 by selectively controlling, such as by means to be described, the application of a vacuum or positive pressure to the individual rows of holders 88.

The manner in which the cigarettes are transferred from drum to drum will now be clearly understood. The surfaces of the drum assemblies 70 and 76 may be similarly formed with rows of holders and orifices. Accordingly, as each cigarette on the drum assembly 70 enters the transfer zone 74 as shown in FIG. 2, it is subjected to a positive gas pressure urging it out of the holders on drum assembly 70 into the opposite row of holders on drum 84. At the same time the orifices 90 in the flutes 89 in the appropriate holders on drum 84 are subjected to a vacuum through chamber 104 (FIG. 6) within the transfer zone, drawing the cigarette into the holders 88 and retaining it on the surface of drum 84. In like manner, when a row of holders on drum 84 enter transfer zone 80, its orifices 91 are subjected to positive gas pressure from conduit 56 through chamber 106 (FIG. 7) and the orifices in the appropriate row of holders on drum 76 are subjected to a vacuum to transfer the cigarette from drum 84 to drum 86. Therefore, if the respective drums are pneumatically driven, the means for transferring and conveying cigarettes in the disclosed system may be operated completely by fluid pressure.

INSPECTION MEANS

The means for inspecting the draft level in the cigarettes, which is also a completely fluid process, is best understood with reference to FIGS. 3–7. When a cigarette is transferred from the drum 70 to the drum 84, it is held in a row of holders 88 with one end adjacent the intermediate stepped portion 84b. The portion 84b contains a number of annular cigarette-end-engaging members 92, mounted within respective passages 93 adjacent each row of holders 88, and each of which may be reciprocated in the directions indicated by arrow 94 (FIG. 4) by a suitable cam mechanism or the like (not shown) in the head 82. As a row of holders 88 passes through the transfer zone 74, the adjacent member 92 is in a retracted position within the passage 93 (FIG. 1). After a cigarette is transferred to the drum 84, the appropriate member 92 is moved outwardly to the position shown in FIGS. 3 and 4 and surroundingly engages the adjacent end of the cigarette 22. The cigarette, upon engagement is moved slightly in an axial direction within the holders 88, so that its other end moves toward the surface of the drum flange 84c (FIG. 5) where it is surroundingly engaged by a similar end-engaging member 96 contained therein. The surrounding engagement of one end of the cigarette by member 92 and the opposite end by member 96 tends to seal the interior of the cigarette from ambient air. Each cigarette is then carried in the sealed arrangement through the testing zone 26.

The means for introducing test pressure into the interior of the cigarette is shown in detail in FIGS. 3 and 4. Each cigarette-end-engaging member 92 includes a passage 92a therein that communicates with a passage 98 in the drum portion 84b. In the region of the testing zone 26, the fixed head 82 is provided with a passage 100 which communicates with the air supply conduit 28 connected to the head and which terminates in a chamber 100a (FIG. 6). During the rotation of the drum 84, the passages 98 leading to the respective cigarette-end-engaging member 92, will communicate in sequence with chamber 100a, admitting gas under prpessure through passages 92a to the interior of each cigarette.

To vent and sense the interior pressure, as seen in FIG. 5, each cigarette-end-engaging member 96 in the surface of the drum flange 84c communicates with a port 99 provided therein. The adjacent fixed head 86 contains a chamber 102 in the region opposite the testing zone 26, so that the stream of gas applied to the interior of the cigarette is received in the chamber through the port 99. As shown in FIG. 7, the chamber 102 may subtend an angle of approximately 25 degrees of drum rotation. The angular extent of the chamber 102 defines the extent of the cigarette testing zone 26. While the pressure input chamber 100a may be of the same angular extent, it may be preferable for high speed operation, to extend it somewhat in advance of the zone 26, for example, a distance 26a (as shown in FIG. 6) so that the cigarettes are prefilled with pressure prior to the beginning of the measurement. Then the pressure within the cigarette will be vented immediately upon the mating of the port 99 with chamber 102 to effect the measurement, avoiding any delay due to pressure transit time through the cigarette.

The outlet conduit 34 connected to the fixed head 86 communicates with the chamber 102. Thus, as each cigarette passes through the testing zone 26, it is subjected to an internal flow of gas, at constant pressure level and if the cigarettes are all of uniform draft, both the flow of gas and the pressure thereof will be of predetermined value at the output chamber 102 and through conduit 34. However, if any one of the cigarettes has a leak therein or has an obstruction which may block the flow, or has a defective filter, a pressure signal indicating a deviation from the proper pressure flow level will be transmitted to the fluidic sensing means 46 through the diaphragm assembly 39 for the duration of the testing of that cigarette. When a leak occurs in a cigarette, or a blockage, a low draft condition, that is, a low rate of pressure flow through the cigarette, will be detected at the chamber 102 and thus a low pressure signal will be picked up by the diaphragm assembly 39 in conduit 38. If the gas flow through the cigarette is high, indicating a high draft condition, perhaps due to a defective filter, a high pressure signal will be sent through diaphragm assembly 39 to the sensing means 46. In either case, the means 46 will accordingly switch its output flow from the exhaust passage 61b to the reject conduit 62, which carries the flow back to the fixed head 86 to operate a rejection means. If desired, a memory or delay system, or a power amplification system, may be placed in the line before the rejection means and operated by the output flow, but for the purposes of our description, conduit 62 will be connected directly to the rejection means.

REJECTION MEANS

The totally fluid-operated rejection means, as shown in FIGS. 3 and 7, firstly comprises the chamber 103 in the fixed head 86, with which the reject conduit 62 communicates. In addition, the drum 84 has the series of internal passageways 91a which respectively communicate with orifices 91 in each of the rows of holders 88 and each of which terminates at a port 91b in end flange 84c. The ports 91b abut and are consequently closed by the surface of the fixed head 86, and are on a common radius with passage 103. Each passage 91a is located circumferentially midway between the row of orifices 91 to which it is connected, and the row immediately in advance thereof in the direction of rotation of the drum 84 (FIG. 6). Chamber 103 commences at the circumferential terminal point of chamber 102 and continues for about the angular space between adjacent cigarettes 22. Since each passage 91a is one-half that angular distance in advance of its orifices 91, it will be seen that if a defect signal is sensed by means 46 and the output switched, resulting in a positive pressure being applied to the passage 103, the pressure will be emitted from the orifice 91, at the midpoint of testing. As ports 91b abut the surface of fixed head 86 during most of the period of drum rotation, no pressure will normally be received therein, but when a passages 91a reaches the point where its port 91b communicates with passage 103, any positive pressure introduced into passage 103 from conduit 62 will be emitted from the line of orifices 91, associated with that particular passage 91a. The positive pressure force exerted on the cigarettes 22 from the orifices 91 may be equal to, greater than, or less than, the vacuum exerted thereon from the orifices 90. If a force greater than the vacuum force is used, the defected cigarette will be positively ejected out of the holders and propelled from the drum 84. If, on the other hand, softer removal is desirable, since there is a centrifugal force on each cigarette due to the rotation of the drum 84, as well as a gravitational force at the lowest point of drum rotation, it is possible to use a positive pressure force equal to or even somewhat less than the opposing vacuum force, in combination with these forces, to cause the defective cigarette to be merely dropped from the drum. Where a high vacuum holding force is employed, or a strong ejection force is desired, a pressure booster can be used to amplify the reject signal from the fluidic sensing means 46 increasing the pressure in conduit 62 to achieve ejection.

At the end of the testing zone 26, the cigarette-end-engaging members 92 and 96 are immediately retracted to insure the release of defective cigarettes. Thus, defective cigarettes may begin to be ejected while still in the testing zone 26 and immediately be removed from the line upon the ceasing of the application of the test pressure permitting extremely rapid inspection of the cigarettes received on the drum. The fluidic sensing means 46 contributes to this high speed inspection by providing a rapid response to the test signals as will now be described.

SENSING MEANS

The fluidic means 46 for sensing the draft level within each cigarette and supplying the reject signal to conduit 62 when the draft level is above or below an acceptable range, is shown in FIG. 1. The input signal to fluidic means 46, indicating the draft level in the cigarette being tested, is fed through a conduit 37 from the pressure-sensing diaphragm assembly 39. The signal in conduit 37 is fed to one control input conduit of each of two fluidic Schmitt triggers 41 and 32. The "Schmitt trigger" is a known bistable fluid amplifier circuit having the characteristic that the output thereof is switched from a normal output passage to an alternate output passage in response to, and for the duration of, a change in a monitored input pressure beyond a predetermined level. By using a variable throttle or variable restriction in the bias input of each of the Schmitt triggers 41 and 42, these devices can be set to indicate any deviation of the input pressure above or below a given pressure range. Accordingly, each of the Schmitt triggers 41 and 42 is set by a respective bias control 41a and 42a to switch its output when the input pressure reaches a predetermined level. The Schmitt trigger 41 is set to switch when the control input signal is beyond a low draft level limit and the Schmitt trigger 42 is set to switch beyond a high draft level limit. It will be remembered that a high draft condition produces a high pressure input and a low draft condition produces a low pressure input to the diaphragm assembly 39.

Each Schmitt trigger, 41 and 42, has a normal flow output passage 41b and 42b connected to an input of a respective fluidic and-gate unit 43 and 44. "And-gates" are known fluid amplifier devices which operate as coincidence circuits wherein a normal output flow is switched from one output passage to another only when input flow is received simultaneously in both its input ports. The other input ports of the and-gate units 43 and 44, are reversely connected to the alternate output passages 42c and 41c, respectively, of the Schmitt triggers 42 and 41. The output flow of the and-gates 43 and 44 is normally through respective passages 43a and 44a, to exhaust. Their alternative output passages 43b and 44b are commonly connected to an input passage 45 of a further and-gate unit 47. The and-gate unit 47 is a coincidence circuit which controls the output of the complete fluidic sensing means 46. Its output flow is normally in exhaust passage 61b, but may be switched when the system provides a signal indicating a defective cigarette.

To insure that the output of the and-gate 47 can be switched only when a cigarette is being tested, a synchronizing means is incorporated in the fluidic circuit. The synchronizing means 50 shown comprises an apertured disc 51, or similar device, which in cooperation with a pressure-producing outlet 52, will provide an input pulse to the and-gate 47 through passage 54 in synchronism with the testing of a cigarette in the test zone 26. Synchronization may be achieved by mounting the disc 51 on the same shaft 57 as the drum 84 and spacing the apertures 53 in accordance with the cigarette spacing. Alternatively, the disc 51 may have more or less apertures 53 than cigarette holding positions on the drum 84 and be operated on a separate shaft as long as the pulses produced in input passage 54 coincide with the number and timing of cigarettes passing through the inspection zone 26. Suitable porting in the drum assembly 20 may be used in place of the disc to supply the input pluses to passage 54 in synchronization with the feeding of the cigarettes.

The pressure providing the synchronizing pulse as well as the power input flow to the other fluidic devices is received through a conduit 55 connected to a suitable source 65 of gas under pressure.

OPERATION

The operation of the overall system can be best understood by considering the above-described system with reference to the pressure pulse diagram shown in FIG. 8. Firstly, the straight line 150 near the top of FIG. 8 represents a zero signal level, while the two broken lines 151 and 152 immediately below respectively represent a low draft level limit and a high draft level limit, as indicated, defining a range of acceptable draft levels in the region between them. A continuous line 153 indicates the level of the input signal, conducted through the conduit 37 from the pressure-sensing diaphragm assembly 39, over a period covering the testing of five cigarettes. The output flow of the two Schmitt triggers 41 and 42 is indicated along the next four lines beneath line 150. For Schmitt trigger 41 which is set at the low draft level, the flow in the output passage 41b for the normal condition is indicated on the upper line 154 and the switched flow in output passage 41c is indicated along the lower line 155. The high-draft-setting Schmitt trigger 42 has the flow in its normal flow output channel 42b indicated on the lower line 157 and the switched flow channel 42c output is shown on the upper line 156. The output of the upper and-gate unit 43 in switched flow passage 43b is indicated on the following line 158 and the similar output 44b of the lower and-gate unit 44 is indicated on the next line 159 beneath. The synchronization pulse input to the third and-gate unit 47 is shown on the next-to-last line 160 and the switched output of and-gate unit 47 into conduit 62, in the form of a reject signal, is shown on the bottom line 161.

Now considering the upper corner of the diagram, it will be seen that the continuous line 153 first indicates a pressure pulse falling in the region between the high and low draft level limits, being fed to the two Schmitt triggers through conduit 37 in response to a pressure signal resulting from the passage of a test pressure through a cigarette in the inspection zone 26. The output flow from Schmitt trigger 41 will be switched from output passage 41c to output passage 41b when the input pressure exceeds the low draft level setting, and the flow will remain in output passage 41b until the input pressure again drops below the low level, whereupon it is switched back to output passage 41c. Since the input pressure in this instance does not exceed the high draft level setting of the second Schmitt trigger 42, its flow will continue in the output passage 42b for the duration of the input signal. As neither of the and-gate units, 43 and 44, receives a positive pressure in both of its input during this period, neither will produce an output in the common passage 45, thus supplying no input to and and-gate unit 47. Consequently, when the synchronization pulse is fed to the and-gate unit 47, the output flow of this and-gate unit in exhaust passage 61b is unaffected.

Although when the pressure input drops to the zero level, the output flow from Schmitt trigger 41 is switched back to passage 41c, causing a coincident input to and-gate unit 44 and thus switching its output flow into passage 44b, since no synch pulse occurs during this period, again the output of and-gate unit 47 remains in passage 61b.

When the second pressure pulse is sensed, since its level is again within the acceptable pressure range, the system will act in exactly the same manner as with the first input pulse. In the case of the third input pulse, however, while the Schmitt trigger 41 will act in the same manner as with the first two pulses since the pressure level again exceeds the low draft level setting, inasmuch as the ultimate magnitude of this pulse exceeds the high draft level limit, the Schmitt trigger 42 will switch its output from passage 42b to passage 42c. This switching produces an input pulse to and-gate unit 43 from the high-draft-setting Schmitt trigger 42, indicating a defective cigarette. The and-gate unit 43 will then be receiving a normal positive signal from the low-draft-setting Schmitt trigger 41 and the switched positive pulse from the high-draft-setting Schmitt trigger 42 and will therefore switch its output from exhaust passage 43a into the commonly joined passage 43b, which provides an input signal to the third and-gate unit 47. When the synchronization pulse is fed simultaneously with this input, the output of the third and-gate unit 47 switches into conduit 62, producing a reject signal for the duration of the synchronization pulse. When the test pressure signal ceases, the various components are switched back or reset to their initial condition.

The fourth cigarette during testing produces a low pressure, low-draft-indicating, pulse so that the output of the low-draft-setting Schmitt trigger 41 remains in output passage 41c while the high-draft-setting Schmitt trigger 42 continues its normal output flow. Since the lower and-gate unit 44 is then receiving two positive input signals, its output will switch from exhaust passage 44a into the passage 44b, providing an input to the third and-gate unit 47. As this input continues, a synchronization pulse will again appear at the other input of the third and-gate unit 47, switching its output from exhaust passage 61b into reject conduit 62. Another reject signal is then applied to the rejection means for the duration of the synchronization pulse.

The fifth pulse is again within the acceptable pressure range, so that the components of the fluidic means 46 will again be switched back to the acceptable flow mode. It will be seen that the fluidic sensing system is switched back or reset to the sensing mode after each test pulse by virtue of the arrangement of the components. Also, reject pulses are only produced when the pressure level of the test gas stream in conduit 38, after passing through the cigarette, exceeds or drops below a predetermined range of acceptable pressures.

It will be seen that, if desired, the third and-gate unit 47 and the synchronization means 50 may be eliminated by modifying the construction (FIG. 7) of chamber 103 and orifices 91b to permit communication between them only for a period corresponding to the duration and spacing of the synchronizing pulses. Then the common passage 45 may be connected directly to the conduit 62, and output flow in the passage will only reject a cigarette during communication between chamber 103 and an orifice 91b which will be timed to coincide with the testing operation.

ALTERNATE EMBODIMENT

It should be noted that the stream of test gas is not received directly in the fluidic sensing means 46 after passing through the cigarette, as in most prior art devices, but rather the pressure pulses are received through the intermediation of the diaphragm assembly 39 so that no contamination of the fluidic sensing means 46 is assured. However, the testing of uncontaminated flow, may, if desired, also be accomplished using the alternate embodiment shown in FIG. 9. In this embodiment, the gas under constant pressure is applied to one end of the cigarette 22 from a source of gas under pressure 31a through a throttle 32a and conduit 28a. The test gas stream is vented to atmosphere after passing through the cigarette by a passage containing throttle 40a. The input pressure signal to the fluidic sensing means 46 is received through conduit 38a, which is connected to input conduit 28a. The operation of the fluidic sensing means 46 in this alternate embodiment will be somewhat different from its operation in the prior embodiment. In this instance, a high draft condition will give a low pressure signal and a low draft condition will give a high pressure signal. For example, a blockage in the cigarette which is a low draft condition, that is, a lower pressure flow across the cigarette, in this case will produce a high pressure input to means 46, as a high back pressure will result. A high draft condition, such as loose tobacco or a defective filter, now will produce a low pressure input rather than a high pressure input, as in the prior embodiment, since the rate of pressure flow is increased through the cigarette. However, in this case, a leak in a cigarette will appear as a high draft condition rather than a low draft condition, since the pressure flow in the cigarette will be higher for the distance traveled from the input end to the leak than if the gas had passed entirely through the cigarette from end to end. Thus, this will result in the sensing of a low pressure by the means 46 as in the prior embodiment. With reference to the operational diagram in FIG. 8, the net effect will be that the continuous line 153 will be inverted, returning to a point above line 152 after the testing of each cigarette.

In any event, it will be seen that the fluidic sensing means 46 divides cigarettes into clearly acceptable and clearly rejected categories, depending only upon whether the pressure test falls within or outside an acceptable pressure range. It does not matter how far above or below the limits of the range the pressure falls, but only that the pressure pulse indicates that the cigarette being tested is incapable of supporting an acceptable draft level. Thus, a precise and efficient inspection is made, permitting the manufacturing process to be adjusted to guarantee the cigarettes meet a precise minimum fixed standard. Further, the inspection and rejection systems of the present invention permit very rapid inspection, being totally fluid operated and therefore almost entirely without inertia, and are extremely reliable, having a minimum of moving parts. The system is also capable of use over a wide range of inspection rates and is therefore adaptable for operation in cooperation with a large number of different manufacturing systems.

What is claimed is:
1. Cigarette inspection apparatus comprising:
   (a) means for conveying a number of cigarettes in sequence through an inspection station;
   (b) means for applying a test pressure to the interior of each cigarette at the inspection station to determine the draft level therein;
   (c) fluidic means for sensing an indication of the draft level of said cigarettes and producing an indicative output when the draft level in a cigarette is outside a predetermined range;
   (d) means responsive to said indicative output for rejecting a cigarette whose draft level indication is outside a predetermined range;
the improvement wherein the fluidic sensing means comprises:
   (e) switching means for directing flow into two normal output paths and responsive to the draft level indication for respectively switching the flow from one of said normal output paths when the draft level either exceeds or drops below the predetermined range; and
   (f) coincidence means responsive to the switching of flow from said switching means for producing said indicative output to actuate said rejecting means.

2. Apparatus as in claim 1, wherein said switching means comprises:
   (i) a first Schmitt trigger having its control input responsive to the indication of the draft level of said cigarettes and set to switch its output flow from a normal path to an alternate path when said draft level exceeds a first predetermined level;
   (ii) a second Schmitt trigger having its control input responsive to the indication of the draft level of said cigarettes and set to switch its output flow from a normal path to an alternate path when said draft level drops below a second predetermined level.

3. Apparatus as in claim 2, wherein said switching means includes:
   (iii) two and-gate units, each responsive to output flow from said first and second Schmitt triggers and for producing an output flow upon the switching of the output flow of either of said Schmitt triggers from its normal path.

4. Apparatus as in claim 3, wherein said coincidence means comprises:
   (iv) a third and-gate unit having one input responsive to said output flow from said two and-gate units; and
   (v) means for producing a sequence of input signals to the other input of said third and-gate unit in synchronism with the application of the test pressure to successive cigarettes at said station, and causing said third and-gate unit to produce said indicative output when an input signal of the sequence is coincident with the output flow from said two and-gate units.

5. Apparatus as in claim 2, including means for resetting said Schmitt triggers after an output is switched to an alternate path comprising:

(iv) means for transmitting an indication of the draft level to said fluidic sensing means while a cigarette is passing through the inspection station;

(c) means on said conveying means for maintaining said cigarettes in a predetermined spaced relation; and (vi) means defining the extent of said inspection station to be less than the spacing between said cigarettes, such that the transmission of the indication will be interrupted after the inspection of each cigarette.

6. Apparatus as in claim 5, wherein said indication transmitting means comprises:

(vii) means defining a chamber in communication with the interior of a cigarette during testing;

(viii) means defining a passage between said chamber and said fluidic sensing means; and (ix) a flexible diaphragm in said chamber interrupting direct communication between the cigarette interior and said passage.

7. Apparatus as in claim 2, wherein said coincidence means comprises:

(iii) two and-gate units, each receiving the normal path output flow from one of said Schmitt triggers and the alternate path output flow from the other Schmit traigger and producing said indicative output in response to the switching of the output flow of either of said Schmitt triggers from its normal path.

8. Apparatus as in claim 1 wherein said test pressure applying means includes means for applying test pressure to the cigarettes prior to entering said inspection station.

9. Apparatus for inspecting the draft level of cigarettes, comprising:

(a) a testing station;

(b) motive means for supplying cigarettes sequentially to and for removing cigarettes sequentially from said testing station in a normal conveying path;

(c) gas pressure means for subjecting the interior of cigarette in said testing station to gas under a pressure different from the pressure outside the cigarette in response to movement of that migarette into said testing station; station;

(d) monitoring means for monitoring the draft level of any cigarette subjected to said gas pressure in said testing station as repersented by the pressure resultting from the resistance to gas flow in the interior of said cigarette, comprising:

(1) two fluid triggers each having a control input indicating the gas pressure in the interior of said cigarette and effective to switch the output of either of said fluid triggers from a normal channel to an alternate channel in response to and for as long as said gas pressure at said control input is respectively above or below a predetermined range and thereby indicates a defect in the cigarette;

(2) coincidence means for respectively receiving the combination of a normal output channel and an alternate output channel from the two fluid triggers and producing an output when the output of the two fluid triggers is concurrent in either combination;

(3) a fluid pulse generator for generating a pulse each time an entering cigarette reaches a certain pointw ithin said testing station;

(4) an output fluid amplifier having first and second output channels and first and second control inputs, one of said control inputs receiving the output of said pulse generator and the other of said control inputs receiving the output of said coincidence means and producing an output in said second output channel in response to concurrent inputs; and (e) means responsive to output in the second output channel of said output fluid amplifier for ejecting any cigarette in said testing station from said normal path to a rejection path.

10. Apparatus as in claim 9 wherein said coincidence means comprises two fluidic and-gate units, each receiving a normal channel from one of said fluid triggers and an alternate channel from the other of said fluid triggers and producing an output upon the switching of the output of either of said fluid triggers from its normal channel.

11. Apparatus as in claim 9, including means for interrupting the application of said gas pressure after the inspection of each cigarette.

12. Apparatus for testing the draft level in hollow articles containing a permeable filler comprising:

(a) conveyor means for moving a succession of said articles in a predetermined spaced relation along a normal path through a testing zone having alength in the direction of movement no greater than one and one-half times the spacing between successive articles;

(b) means for connecting the interior of each article in the testing zone to a source of fluid under a pressure having a predetermined difference from the ambient pressure outside said article;

(c) means for sensing the interior pressure of each article as it moves through the testing zone; and (d) means for ejecting form said normal path each article whose interior pressure is outside of a predetermined range of pressures thereby indicating a defect in said article;

wherein the improvement comprises:

(e) a first bistable fluid amplifier means in said sensing means to produce a normal output signal only when the interior pressure of an article is within said predetermined range and a contrasting output signal when the interior pressure is above said range;

(f) a second bistable fluid amplifier means in said sensing means to produce a normal output signal only when the interior pressure of an article is within said predetermined range and a contrasting output signal when the interior pressure is below said range;

(g) first coincidence fluid amplifier means operatively connected to said ejected means and shiftable between a normal condition in which it does not actuate the ejecting means and a reject condition in which it does actuate the rejecting means;

(h) means synchronized with said conveyor means for producing a normal output signal except when an article passes a predetermined point in said station and a contrasting output signal when an article passes said point;

(i) second coincidence fluid amplifier means responsive only to the coincident combination of a normal and a contrasting signal from both of said bistable fluid amplifier means to switch said first coincidence fluid amplifier means to its reject condition.

13. The method of inspecting cigarettes comprising the steps of:

(a) conveying a number of cigarettes in sequence through an inspection station;

(b) applying a test pressure to the interior of each cigarette at the inspection station to determine draft level therein;

(c) sensing an indication of the draft level of said cigarettes;

(d) directing flow along two normal paths and switching the flow from one of said paths into a respective alternate path when said sensed draft level indication either exceeds or drops below a predetermined range of levels;

(e) producing a signal in response to the switching of the flow into either of said alternate paths; and (f) using said signal for rejecting the cigarette which caused said signal to be produced.

14. Method for inspecting the draft level of cigarettes comprising:
  (a) supplying cigarettes sequentially to and removing cigarettes sequentially from a testing station in a normal conveying path;
  (b) subjecting the interior of any cigarette in said testing station to gas under a pressure different from the pressure outside the cigarette in response to movement of that cigarette into said testing station;
  (c) monitoring the draft level of any cigarette subjected to said gas pressure in said testing station by sensing the pressure resulting from the resistance to gas flow in the interior of said cigarette;
  (d) directing fluid flow along two normal paths and switching the flow from one of said paths into a respective alternate path in response to and for as long as said sensed pressure is either above or below a predetermined range and thereby indicates a defect in the cigarette;
  (e) producing a first fluid signal in response to the switching of the fluid flow into either of said alternate paths;
  (f) producing a second fluid signal each time an entering cigarette reaches a certain point within said testing station;
  (g) sensing said first and second fluid signals and producing a third fluid signal when said first and second fluid signals are sensed coincidentally; and
  (h) using said third fluid signal for rejecting the cigarette which caused said third fluid signal to be produced.

15. Method for testing the draft level in hollow articles containing a permeable filler, comprising the steps of:
  (a) moving a succession of said articles in a predetermined spaced relation along a normal path through a testing zone having a length in the direction of movement no greater than one and one-half times the spacing between the successive articles;
  (b) connecting the interior of each article in the testing zone to a source of fluid under pressure having a predetermined difference from the ambient pressure outside said article;
  (c) sensing the interior pressure of each article as it moves through the testing zone;
  (d) producing a first signal along a normal path only when the interior pressure of an article is within a predetermined range and switching said first signal to a first contrasting path when said pressure is above said range;
  (e) producing a second signal along a normal path only when the interior pressure of an article is within a predetermined range and switching said second signal to a second contrasting path when said pressure is below said range;
  (f) producing a third signal in a normal output path except when an article passes a predetermined point in said station and switching said third signal to a third contrasting path when an article passes said point;
  (g) sensing signals in said first, second and third contrasting paths and producing a fourth signal when signals are sensed coincidentally in said third contrasting path and either of said first and second contrasting paths; and
  (h) using said four signal for rejecting the article which caused said fourth signal to be produced.

References Cited

UNITED STATES PATENTS

| | | | |
|---|---|---|---|
| 3,363,452 | 1/1968 | McArthur | 73—45.2 |
| 3,423,990 | 1/1969 | Martin | 73—45.1 |
| 3,426,582 | 2/1969 | McArthur et al. | 73—45.1 |
| 3,426,583 | 2/1969 | McArthur et al. | 73—45.1 |
| 3,499,599 | 3/1970 | Meininger et al. | 137—81.5 X |
| 3,532,081 | 10/1970 | Eastman | 137—81.5 X |

LOUIS R. PRINCE, Primary Examiner

W. A. HENRY II, Assistant Examiner

U.S. Cl. X.R.

137—81.5

UNITED STATES PATENT OFFICE
CERTIFICATE OF CORRECTION

Patent No. 3,618,365　　　　　　　Dated November 9, 1971

Inventor(s) Colin S. McArthur

It is certified that error appears in the above-identified patent and that said Letters Patent are hereby corrected as shown below:

In the specification, column 1, line 60, delete entire line (printed twice).

column 1, line 63, "presnet" should be -- present --.

column 6, line 72, "32" should be -- 42 --.

column 7, line 54, "pluses" should be -- pulses --.

Claim 9, sub-paragraph (c), line 40, before "cigarette" insert -- any --.

" " line 42, change "migarette" to -- cigarette --.

" " line 44, delete "station;".

Signed and sealed this 2nd day of May 1972.

(SEAL)
Attest:

EDWARD M. FLETCHER, JR.
Attesting Officer

ROBERT GOTTSCHALK
Commissioner of Patents